April 23, 1940.   K. A. SYLVESTER   2,198,321
CLUTCH CONTROL MECHANISM
Filed March 12, 1938
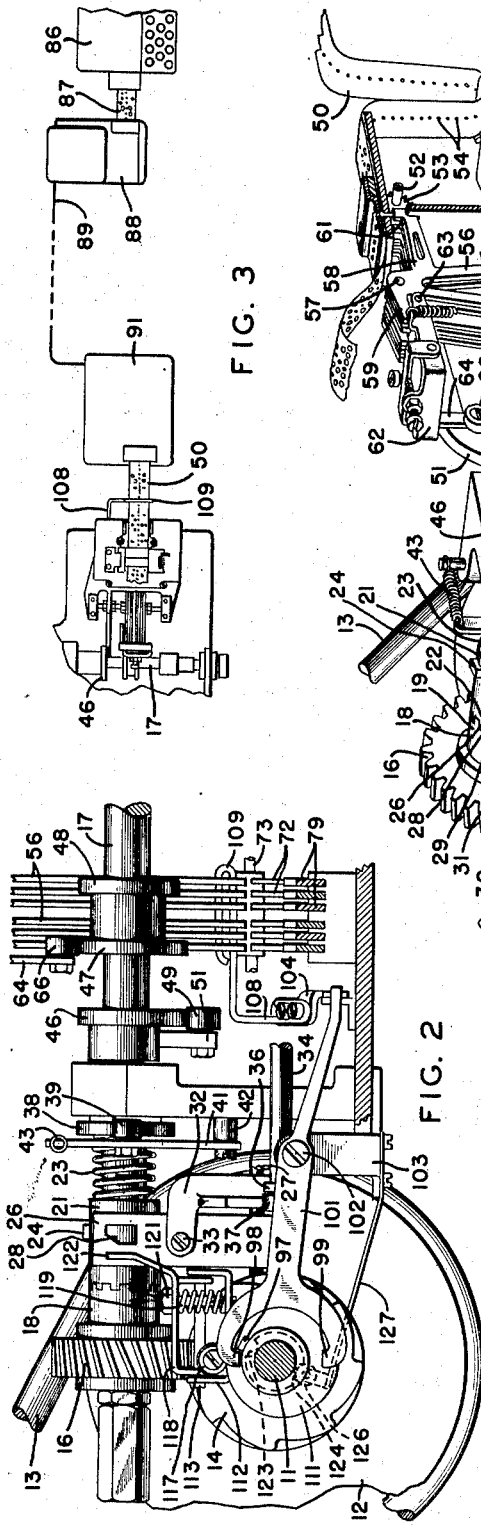
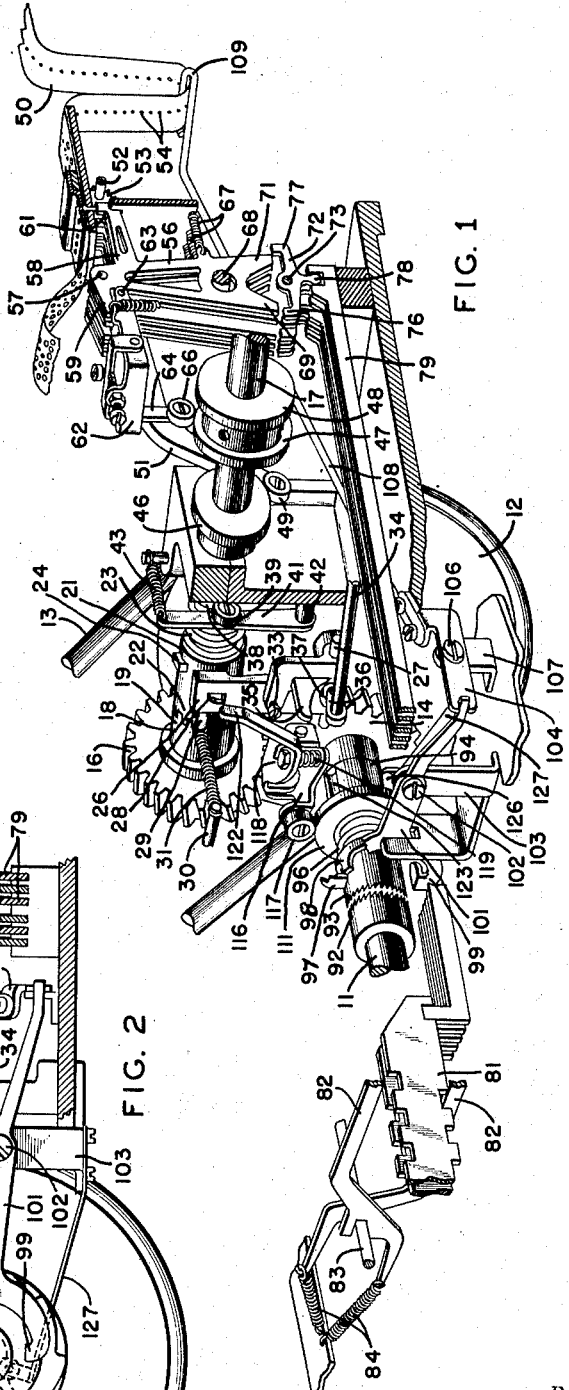
INVENTOR.
KIMMEL A. SYLVESTER
BY
ATTORNEY.

Patented Apr. 23, 1940

2,198,321

UNITED STATES PATENT OFFICE 2,198,321

CLUTCH CONTROL MECHANISM

Kimmel A. Sylvester, Des Plaines, Ill., assignor, by mesne assignments, to Teletypesetter Corporation, a corporation of Delaware Application March 12, 1938, Serial No. 195,509

15 Claims. (Cl. 199—18)

This invention relates to tape controlled apparatus and particularly to a mechanism for arresting and restarting the apparatus in response to conditions of tautness or slackness in the control tape.

An object of the invention is to provide entirely mechanical apparatus by means of which a control tape having relatively low resistance to tearing is enabled to control the transmission of a relatively large amount of power to the apparatus which the tape controls.

The invention features a power transmitting clutch mechanism the load upon which is relatively small and which, therefore, may be controlled by a signal storage tape of the usual material, the clutch transmitting power to control a working or operating clutch the loads upon which are relatively severe as compared with the load upon the first mentioned clutch.

The invention also features a positive drive half-revolution clutch which is controlled in a manner similar to the operation of escapement mechanisms.

Briefly, the invention contemplates a continuously operable power shaft to which is geared the driving portion of a positively engageable clutch mechanism, the driven portion of which is secured to a shaft that times and performs the operations of the tape controlled apparatus. The clutch through which the timing and operating power is transmitted is of the spring loaded type which is arrested by moving a clutch throwout lever into the path of a stop lug with which the throwout lever cooperates to effect separation of the clutch elements. The clutch throwout lever is spring biased toward ineffective position.

The power shaft to which the operating shaft is geared has secured to it the driving portion of a smaller and lighter duty positive drive clutch mechanism, and the spring loaded driven portion of the clutch mechanism is free on the power shaft and is keyed to a cam sleeve which carries a cam against which rides a cam follower. The cam follower is associated with a lever which is operable to present the previously mentioned clutch throwout lever in the path of the stop lug to effect arrestment of the timing and operating shaft. When the cam controlled lever falls away from the clutch throwout lever, the biasing spring of the latter withdraws it from blocking relation to the clutch throwout lug, and the operating shaft is permitted to be restarted.

The light duty clutch is controlled by a lever having two clutch throwout arms presented approximately 180 degrees apart with reference to the driven portion of the clutch. A single clutch throwout cam carried by the driven portion of the light duty clutch engages the arms of the clutch control lever alternately to effect arrestment of the cam after one-half revolution thereof. The clutch throwout lever is controlled by a tape responsive lever which has a loop through which the tape passes to the tape controlled mechanism, and the tape engaging end of the tape responsive lever is lifted and lowered as the tape becomes taut or slack.

For a complete understanding of the invention, reference may be had to the following detailed description to be considered in conjunction with the accompanying drawing wherein, Fig. 1 is a schematic perspective view of a tape controlled apparatus including a tape stop mechanism according to the present invention;

Fig. 2 is an elevational view partly in section of the tape controlled mechanism and tape responsive power stop control shown in Fig. 1; and Fig. 3 is a diagrammatic view showing the relation of the tape controlled mechanism to its source of control tape, and the relationship of the tape responsive lever arm to both instrumentalities.

The taut and slack tape mechanism, according to the present invention, has been disclosed herein as applied to a tape controlled operating unit for a linecasting and composing machine as disclosed in Patent No. 2,091,286 granted August 31, 1937 to H. L. Krum et al.

Referring now to the drawing in which like reference numerals designate corresponding parts throughout the several views, reference numeral 11 indicates a continuously operable power shaft, driving member or power means to which is secured a pulley 12 engaged by driving belt 13, which is continuously driven from any suitable source of power such as the intermediate shaft of a linecasting and composing machine. Shaft 11 has fixed thereto a gear 14 with which is meshed a gear 16 carried by a shaft 17 which may be designated as a record reader shaft. Gear 16 is secured to a sleeve 18, which is freely rotatable upon shaft 17 independently thereof, and which is provided with square cut clutch teeth 19. A similar sleeve 21 is slidably keyed to shaft 17 and is provided with square cut clutch teeth 22 presented toward clutch teeth 19 for cooperation therewith.

A compression spring 23 urges driven clutch sleeve 21 to engage driving clutch sleeve 18. Driven clutch sleeve 21 is provided with a clutch throwout lug 24 for cooperation with which a clutch throwout lever 26 is pivoted on pivot rod 27. Clutch throwout lever 26 is provided with an aperture 28, which lug 24 is adapted to enter when lever 26 is rocked into its path, and aperture 28 has one wall disposed in an oblique plane to exert a camming effect upon clutch throwout lug 24 and shift driven clutch sleeve 21 axially upon shaft 17 out of engagement with driving sleeve 18.

Clutch throwout lever 26 carries a spring post 29 which is engaged by one end of a tension spring 31 the other end of which is supported by a fixed spring post 30. Spring 31 is effective to withdraw clutch throwout lever 26 out of the path of lug 24 and to hold it out when it is desired that shaft 17 shall be rotated continuously. A lever 32 for controlling clutch throwout lever 26 is also pivoted upon pivot rod 27 and carries at its free end an adjustable abutment screw 33 through which movement may be imparted to clutch throwout lever 26 in a direction to effect arrestment of lug 24. Lever 32 has a laterally extending ear 35, the lower edge of which is arcuate to provide a cam surface. A rock shaft 34, provided externally of the apparatus with a handle (not shown), carries an arm 36 at the free end of which is supported an anti-friction roll 37. Arm 36, when presented in horizontal position, engages a portion of the arcuate lower edge of ear 35 which permits lever 32 to retire to its extreme counterclockwise position, under which condition clutch throwout lever 26 may also occupy its extreme counterclockwise position, out of the path of lug 24. When rock shaft 34 is rocked counterclockwise, anti-friction roll 37 traverses the arcuate lower edge of ear 35 and rocks lever 32 in clockwise direction. Lever 32 imparts clockwise rotation to clutch throwout lever 26 through abutment screw 33 and rocks the clutch throwout lever into extreme clockwise position to arrest driven clutch sleeve 21.

Shaft 17 has secured thereto a cam 38 which is engaged by anti-friction roll 39 carried by detent lever 41 pivoted upon stud 42. Detent lever 41 is biased clockwise, as viewed from the foremost end of shaft 17, by spring 43, and cam 38 is provided with a sharp drop-off which is presented to anti-friction follower roller 39 at about the instant separation of clutch sleeves 18 and 21 is effected by cooperation of lug 24 with aperture 28 of clutch throwout lever 26. The function of detent 41 is to impart to shaft 17 a torque at the time of separation of the clutch elements so that slight additional axial movement shall be imparted to clutch sleeve 21, and rubbing of the teeth and accompanying noise and wear during periods of arrestment of shaft 17 shall not occur.

Shaft 17 also has secured thereto cams 46, 47, and 48 which control tape feeding, tape sensing, and signal transferring operations. Cam 46 is engaged by a follower roll 49 carried by one end of a pivoted tape feed lever 51 which has at its opposite end a pawl (not shown) to operate a ratchet (also not shown) carried by tape feed shaft 52. Shaft 52 has secured thereto a tape feed sprocket 53 which engages feed perforations 54 in the control tape 50 and which advances the tape one step for each operation of tape feed lever 51, the lever being operated once for each cycle of rotation of cam 46.

A plurality of tape sensing levers 56 are rockably mounted upon a pivot rod 57 and are provided adjacent to the point of pivotal mounting with oppositely extending arms 58 and 59. Arms 58 are provided with individual upstanding tape sensing pins 61 which are adapted to enter code perforations in control tape 50, there being a tape sensing lever 56 and pin 61 for each of the possible perforations in a code combination. A bail 62 carries a rod 63 which extends across under all of the arms 59 of tape sensing levers 56. Bail 62 is operated by cam 47 through cam follower arm 64 carrying follower roll 66, and the operation of the bail is such as to lift rod 63, which engages arms 59 of the tape sensing levers 56, and rocks the levers clockwise about pivot rod 57, thus withdrawing tape sensing pins 61 from code perforations in tape 50. After the tape sensing pins have been withdrawn, tape 50 is advanced under the control of cam 46, and thereafter bail 62 lowers rod 63, and levers 56 respond to their biasing springs 67 and seek to present their sensing pins 61 in code perforations in tape 50. All of the tape sensing levers 56 rock counterclockwise a short distance, and those, the tape sensing pins which encounter imperforate portions of tape 50, are arrested, while those which find perforations continue in counterclockwise direction until their pins have entered the perforations. A stop rod 68, extending through oversize apertures in tape sensing levers 56, limits the movement of the levers in tape sensing direction and also in sensing pin withdrawing direction. At their lower ends, tape sensing levers 56 are provided with spaced left- and right-hand abutment arms 69 and 71, respectively.

Below tape sensing levers 56, a set of T-shaped transfer levers 72, equal in number to the number of tape sensing levers 56, is pivotally supported upon a rod 73 carried by a transfer bail which has been omitted from the drawing for the sake of simplicity. Transfer levers 72 are provided with left- and right-hand upstanding abutments 76 and 77, respectively, the spacing between which is sufficiently greater than the spacing between arms 69 and 71 of tape sensing levers 56 that the left-hand abutments 69 and 77 of the tape sensing levers 56 and transfer levers 72, respectively, may be in vertical alignment, or the right-hand abutments of those levers may be in alignment depending upon whether a tape sensing pin 61 is engaging an imperforate portion of tape 50 or has entered a perforation. After cam 47 has operated to permit tape sensing levers 61 to seek admission into the code perforations in the tape, rod 73, which supports the transfer levers 72, is lifted by the transfer bail (not shown), which is operated by cam 48, to bring the transfer levers into engagement with the tape sensing levers 56. Those of the transfer levers 72 that engage tape sensing levers, the pins 61 of which have encountered imperforate portions of the tape, are rocked counterclockwise, and those of the transfer levers which engage tape sensing levers, the pins 61 of which have entered code perforations, are rocked clockwise.

Transfer levers 72 have depending arms 78 which terminate in disc-like portions that are fitted into slots contained in the right-hand ends of code bar extensions 79. At their left-hand ends, extensions 79 engage permutation code bars 81, the number of code bars and code bar extensions being the same as the number of transfer levers, tape sensing levers, and the possible number of perforations in a signal combination. The upper and lower edges of code bars 81 are notched permutatively, and selectable bars 82 are pivotally mounted upon a common pivot rod 83 so as to extend across the set of code bars 81, some being presented to seek engagement with the upper edges of the code bars and others being presented to seek engagement with the lower edges of the code bars. Tension springs 84 bias the upper and lower selectable bars 82 to seek engagement with the edges of code bars 81.

The rocking of transfer levers 72 clockwise or counterclockwise according to the disposition of tape sensing levers 56 results in corresponding leftward or rightward presentation of code bar extensions 79 and code bars 81. For each characteristic setting of code bars 81, under the control of tape sensing levers 56, an alignment of notches is presented to one of the selectable bars 82 which may respond to its biasing spring 84 and enter the alignment of notches. The operations occurring following the entry of a selectable bar 82 into an alignment of notches are not disclosed herein, but it may be learned by reference to the hereinbefore identified patent that the selectable bar thus moves into the path of an operating bail by which it may be operated to perform any desired function, such as for example, the operation of a weight bar in a linecasting and composing machine to effect the release of a matrix. It may also be learned by reference to that patent that the operating bail is operated by shaft 17 and that there is a stripper bail also driven by shaft 17 which lifts a selected bar 82 out of the alignment of notches after it has been operated, and which lifts all of the other selectable bars out of engagement with the edges of code bars 81 to remove any frictional resistance which the selectable bars may exert upon code bars 81 to permit the code bars to be set according to the next signal combination sensed by tape sensing levers 56 and transferred by operation of cam 48.

The apparatus described in the foregoing pages includes no portion of the present invention except as invention may reside in the combination of the apparatus described above with the mechanism to be described later, but the description is set forth briefly in order that the nature of the invention and its relation to a tape controlled apparatus may be understood. A much more complete disclosure and description of the apparatus hereinbefore described may be found in the previously mentioned Patent No. 2,091,286 to H. L. Krum et al.

When the tape controlled mechanism heretofore described is to be controlled by tape prepared in substantial quantity in advance, the tape controlled mechanism may be permitted to operate substantially continuously until the supply of tape has been exhausted and no power stop control is required. However, it may sometimes be desirable to operate the tape controlled apparatus by tape prepared in accordance with signals received from a distant point over a telegraph line. Such an arrangement is indicated diagrammatically in Fig. 3, wherein reference numeral 86 designates a keyboard operated tape perforating mechanism for preparing control tape for controlling the generation of telegraphic signal impulses capable of controlling a tape apparatus, such as that shown in Fig. 1, located at a point remote from perforator 86. The tape prepared by the perforator is indicated 87, and after being delivered from perforator 86, it enters a tape controlled telegraph transmitter 88. Keyboard tape perforator 86 may be of the type disclosed in Patent No. 2,059,250 granted November 3, 1936 to H. L. Krum, and tape transmitter 88 may be of the type disclosed in Patent No. 1,460,357 granted June 26, 1923 to E. E. Kleinschmidt. Transmitter 88 impresses upon telegraph line 89 signals according to the code combinations contained in tape 87. At the receiving end of the telegraph line 89, a reperforator 91 is connected, which may be of the type disclosed in Patent No. 1,884,743 granted October 25, 1932 to E. E. Kleinschmidt. The function of reperforator 91 is to prepare the perforated tape, which has already been designated by the reference numeral 50, to control the record reader mechanism of Fig. 1.

It is characteristic of telegraph transmitting systems in which the transmission is controlled by tape fed directly from a keyboard operated perforator to the transmitter that the time lag between preparation of the tape and transmission of the signals contained in the tape may be so small that any material interruption in the operation of the perforator may result in arrestment of the transmitter, which will also result in cessation of telegraphic transmission and arrestment of reperforator 91. With the reperforator inactive, it is necessary to arrest the tape sensing and tape controlled apparatus as soon as any slackness of tape between the reperforator and the tape sensing mechanism has been taken up, in order that the tape shall not be severed nor feed perforations or code perforations destroyed by attempting to feed the tape through the tape sensing mechanism after the tape has become taut. The apparatus about to be described is intended to effect arrestment of the previously described tape controlled apparatus when the tape has become taut.

As shown in Fig. 1, continuously driven shaft 11 has secured thereto the driving element 92 of a positive drive clutch mechanism. The driven element 93 is slidable axially of shaft 11 for engagement with and disengagement from driving element 92 and is keyed to a cam sleeve 94 which is supported by shaft 11 but is free of said shaft so that it may be held stationary while shaft 11 is rotating. A compression spring 96 confined between cam sleeve 94 and driven clutch element 93 urges the clutch element into engagement with driving element 92. Driven clutch element 93 carries a single clutch throwout cam 97 which is adapted to be engaged by either of two arms 98 and 99 of a clutch throwout lever 101. Clutch throwout lever 101 is pivoted upon shoulder screw 102 carried by bracket 103. The free ends of the two arms 98 and 99 of clutch throwout lever 101 are presented substantially at diametrically opposite points relative to driven clutch element 93, and the spacing between the free ends of arms 98 and 99 is such that either may be presented in the path of clutch throwout cam 97, the upper arm 98 being in the path of cam 97 when clutch throwout lever 101 is presented in its extreme counterclockwise position, as viewed in Fig. 2, and the lower arm 99 being presented in the path of the cam 97 when lever 101 occupies its extreme clockwise position. As soon as one of the arms of lever 101 is drawn out of blocking relation to cam 97, the other is presented into the path of the cam, the two-armed clutch throwout lever and driven clutch element thus operating similarly to an escapement, so that driven clutch element 93 cannot rotate more than one-half revolution before being arrested by cooperation of throwout cam 97 with one of the lever arms 98 and 99. The contour of cam 97 is such that when it engages either of arms 98 or 99, driven clutch element 93 is shifted axially of shaft 11 out of engagement with driving element 92.

The end of lever 101 opposite to that which carries arm 98 and 99 is disposed in a slot cut in one end of a lever 104 pivotally supported by a shoulder screw 106 upon bracket 107. The slot is cut in lever 104 at the left-hand end, as viewed in Fig. 1, and at the right-hand end, lever 104 supports an arm 108 which is several times as long as the distance from the point at which lever 104 is pivotally supported to its slotted end. The free end of arm 108 is formed into a loop 109 through which tape 50 passes in traveling from reperforator 91, shown in Fig. 3, to tape feeding sprocket 53 in the tape controlled apparatus.

Cam sleeve 94 has secured thereto a cam 111 which may, if desired, be a simple eccentric so positioned upon the cam sleeve that in one position of arrestment of driven clutch element 93, the portion of cam 111 of shortest radius is presented upwardly, and when driven clutch element 93 is arrested in its other position, the portion of cam 111 of longest radius is presented upwardly. A further requirement upon the orientation of cam or eccentric 111 with respect to driven clutch element 93 is that the portion of longest radius shall be presented upwardly when clutch element 93 is arrested by the lower clutch throwout arm 99, and the portion of shortest radius shall be presented upwardly when the clutch mechanism is arrested by the upper throwout arm 98.

A bail shaped lever 112 is pivotally supported by means of its opposed arms upon a pivot shaft 113 and is provided with an arm 116 (Fig. 1) which carries a cam follower roll 117 which bears continuously against cam or eccentric 111. A similar bail shaped lever 118 is also supported by shaft 113 in opposed relation to bail shaped lever 112, a compression spring 119 being interposed between bail shaped levers 112 and 118 and being retained in position by a screw 121 which passes through a clearance hole in lever 118 and threadedly engages lever 112. Bail shaped lever 118 is provided with an upwardly extending arm 122 which engages clutch throwout lever 26 for the record reader shaft clutch comprising driving element 18 and driven element 21. When cam follower 117 is lifted to its highest position by cam or eccentric 111, bail shaped lever 112 is rocked and the rocking movement is transmitted to bail shaped lever 118 through yield spring 119 whereby arm 122 rocks clutch throwout lever 26 in clockwise direction, as viewed in Fig. 1, to effect arrestment of the record reader clutch driven element 21. When cam 111 is rotated 180 degrees from this position, follower roller 117 is lowered, arm 122 falls away from clutch throwout lever 26, and tension spring 31 withdraws the clutch throwout lever from blocking relation to clutch throwout lug 24. Cam sleeve 94 is provided with diametrically opposed recesses 123 and 124 with which there cooperates a detent roller 126 secured to the free end of a spring arm 127. Detent roller 126 enters recesses 123 or 124 when cam 111 is brought into either of the two positions in which it is intended to be arrested, and thus stopping of the cam 111 exactly in the desired positions is assured.

In operation, when there is an excess of tape between reperforator 91 and the tape controlled mechanism, loop 109 of arm 108 is in its lowermost position, lever 104 is disposed in extreme clockwise position, and clutch throwout lever 101 is disposed in extreme counterclockwise position whereby its upper arm 98 is holding driven clutch element 93 separated from driving element 92 upon shaft 11, cam follower roller 117 occupies its lowermost position, lever arm 122 is in extreme counterclockwise position, and the tape feeding and sensing operations are proceeding under control of continuously rotating shaft 17. This is the condition indicated in Figs. 1 and 2. If telegraph signals cease to be received by reperforator 91, the feeding of tape out of reperforator 91 will be stopped, and as tape feeding sprocket 53 in the tape controlled apparatus continues to advance the tape past the tape sensing positions, the loop of tape in which loop 109 of arm 108 is presented will be taken up and loop 109 will be lifted step by step, thus resulting in counterclockwise rocking of lever 104. The arcuate movement of the slotted end of lever 104 is very small as compared with the arcuate travel of loop 109 whereby a multiplication of forces is obtained. The counterclockwise rocking of lever 104 results in clockwise rocking of lever 101, and eventually the loop of tape 50 becomes sufficiently small to lift arm 98 of clutch throwout lever 101 out of restraining engagement with clutch throwout cam 97. Driven element 93 thereupon moves into engagement with driving element 92, and cam 111 is rotated 180 degrees whereupon clutch element 93 is arrested by the lower arm 99 of clutch throwout lever 101, the two arms 98 and 99 operating in the manner of an escapement to permit rotation of cam 111 in half a revolution step. The rotation of cam 111 through 180 degrees results in lifting of cam follower 117, which as previously described, effects rocking of clutch throwout lever 26 into position to arrest record reader shaft 17. Compression spring 119 provides a yield so that there will be no damage to the apparatus should clutch throwout lug 24 be presented in position to block clutch throwout lever 26 when that lever is moved toward its clutch arresting position. The tape controlled mechanism will be arrested when lug 24 enters aperture 28.

When subsequently reperforator 91 begins to operate, a loop of tape will begin to form, and as loop 109 of arm 108 is lowered, lever 104 will be rocked clockwise, clutch throwout lever 101 will be rocked counterclockwise, and clutch throwout cam 97 will escape and revolve with driven clutch element 93 through one-half revolution, thus restoring cam 111 into the position shown in Figs. 1 and 2 and permitting clutch throwout lever 26 to be withdrawn by spring 31 so that shaft 17 may again be driven.

The work that shaft 17 is required to perform necessitates a relatively sturdy clutch mechanism for driving the shaft. Furthermore, considerable friction is developed between the square cut teeth of the driving element 18 and driven element 21, and the clutch throwout mechanism is, therefore, required to be equally sturdy. It would be difficult, if not impossible, to control clutch throwout lever 26 directly by the kind of tape that is ordinarily used for record purposes. However, by providing a control mechanism for the clutch throwout lever, which is power driven and which is provided through another and lighter clutch, and by providing a lever system for the control of the last mentioned clutch whereby a multiplication of forces is obtained, the relatively flimsy tape is enabled to control the light duty clutch, and this clutch is, in turn, capable of driving mechanism to control the heavy duty clutch. Thus, an all mechanical tape stop mechanism is achieved by means of which a relatively thin and weak paper tape, which is further weakened by the perforation of signal combinations therein, is enabled to control the heavy duty clutch through which power is transmitted for performing the tape sensing, feeding, signal transferring, and function performing operations in a tape controlled mechanism.

Although a particular embodiment of the invention has been described herein, it will be understood that the invention is capable of modification and rearrangement and substitution of parts without departing from the spirit of the invention and within the scope of the appended claims.

What is claimed is:

1. In a tape controlled apparatus, a driving member, means for advancing and sensing a control tape, means for connecting and disconnecting said driving member to and from said tape advancing and sensing means, and means actuated by power from said driving member for controlling said connecting and disconnecting means.

2. In a record tape controlled apparatus, a power operated shaft, a record reader shaft, means actuated by said record reader shaft for giving effect to the tape records, a clutch mechanism for connecting said record reader shaft to said power operated shaft, means operated by power from said power operated shaft for controlling said clutch, and means controlled in accordance with the path traversed by said record tape for controlling said clutch controlling means.

3. In a record tape controlled apparatus, a power operated shaft, means operated by said shaft for driving said tape controlled apparatus, means also operated by said shaft for controlling the driving of said tape controlled apparatus, and tape tension responsive means for controlling said last mentioned means.

4. In a record tape controlled apparatus, tape advancing and tape sensing means, means for giving effect to the tape records sensed, means for driving both of the means, means for disconnecting the driving means therefrom, means actuated by said driving means for operating said disconnecting means, and tape tension responsive means for controlling said operating means.

5. In a record tape controlled apparatus, a power driven shaft, a record reader shaft, positive clutch means for connecting said record reader shaft to said power driven shaft, means controlled by said record reader shaft for advancing a record tape, means also controlled by said record reader shaft for giving effect to the tape records, means for controlling the engagement and disengagement of said clutch means, positive clutch means for connecting said controlling means to said power driven shaft, and means operative according to the quantity of tape available to said tape advancing means for controlling the second mentioned positive clutch means.

6. In a record reader mechanism, a power driven shaft, a record reader shaft, a positive drive clutch interposed between said shafts, a lever for controlling the engagement and disengagement of said clutch, a cam and follower for said clutch controlling lever, a clutch interposed between said power driven shaft and said cam, and means controlled by record material for controlling said last mentioned clutch.

7. In a record reader mechanism adapted to be controlled by a record tape, a power driven shaft, a record reader shaft, a positive drive clutch interposed between said shafts, a lever for controlling the engagement and disengagement of said clutch, a cam and follower for said clutch controlling lever, a clutch interposed between said power driven shaft and said cam, means for imparting effectiveness to the last mentioned clutch in half-revolution cycles, and means responsive to the tension of said record tape for controlling the last mentioned means.

8. In a record reader mechanism adapted to be controlled by a record tape, a power driven shaft, a record reader shaft, a clutch interposed between said shafts, a cam effective in one position to control disengagement of said clutch and in another position to control engagement of said clutch, half-revolution clutch means for presenting said cam in either of said positions, and means controlled according to the tension of said record tape for controlling said half-revolution clutch means.

9. In a record reader mechanism adapted to be controlled by a record tape, a power driven shaft, a record reader shaft, a clutch interposed between said shafts, means for controlling the engagement and disengagement of said clutch, a cam for controlling the operation of said clutch controlling means, means for driving said cam, escapement means for controlling the rotation of said cam in half-revolution cycles, and tape tension responsive means for controlling said escapement means.

10. In a record reader mechanism adapted to be controlled by a record tape, a power driven shaft, a record reader shaft, a clutch interposed between said shafts, a cam effective in one position to control disengagement of said clutch and in another position to control engagement of said clutch, means for driving said cam, escapement means for controlling the rotation of said cam in half-revolution cycles, detent means for maintaining said cam in the desired stop positions, and tape tension responsive means for controlling said escapement means.

11. In a record reader mechanism adapted to be controlled by a record tape, a power driven shaft, a record reader shaft, a clutch interposed between said shafts, a cam effective to control the engagement and disengagement of said clutch, means for driving said cam, means for releasing said cam for rotation and for arresting said cam in predetermined positions, and means engaging said record tape and responsive to tension conditions therein for controlling said cam releasing and arresting means, said tape tension responsive means amplifying the force applied thereto by said tape.

12. In a tape controlled apparatus, a power operated shaft, a shaft to be driven therefrom, a clutch mechanism interposed between said shafts, means operated by said driven shaft for actuating said tape controlled apparatus, means also driven from said power operated shaft for controlling said clutch, and tape loop responsive means for controlling said last mentioned means.

13. In a tape controlled apparatus, a power operated shaft, a shaft to be driven therefrom, a clutch mechanism interposed between said shafts, means operated by said driven shaft for actuating said tape controlled apparatus, means also driven from said power operated shaft for controlling said clutch, a clutch mechanism interposed between said power operated shaft and said controlling means, and tape loop responsive means for controlling said last mentioned means.

14. In a tape controlled apparatus, a power operated shaft, a shaft to be driven therefrom, a clutch mechanism interposed between said shafts, means operated by said driven shaft for actuating said tape controlled apparatus, means also driven from said power operated shaft for controlling said clutch, a clutch mechanism interposed between said power actuated shaft and said controlling means, means for releasing the last mentioned clutch mechanism for half revolution cycles of operation, and tape loop responsive means for controlling said last mentioned means.

15. In a tape controlled apparatus, power means, means for advancing and sensing a control tape, means for communicating power from said power means to said advancing and sensing means, and means actuated by said power means for controlling said power communicating means and accordingly the power communicated to said advancing and sensing means.

KIMMEL A. SYLVESTER.